US 6,625,596 B1

United States Patent
Nunez

(10) Patent No.: US 6,625,596 B1
(45) Date of Patent: Sep. 23, 2003

(54) DOCUBASE INDEXING, SEARCHING AND DATA RETRIEVAL

(75) Inventor: Chris Nunez, Trabuco Canyon, CA (US)

(73) Assignee: Centor Software Corporation, Irvine, CA (US)

( * ) Notice: Subject to any disclaimer, the term of this patent is extended or adjusted under 35 U.S.C. 154(b) by 192 days.

(21) Appl. No.: 09/624,054

(22) Filed: Jul. 24, 2000

(51) Int. Cl.[7] .............................................. G06F 17/30
(52) U.S. Cl. ................................................. 707/3; 707/4
(58) Field of Search .............................. 707/3, 4, 5, 10, 707/101, 102, 203, 513, 104.1, 501.1, 515, 517; 345/260

(56) References Cited

U.S. PATENT DOCUMENTS

| | | | |
|---|---|---|---|
| 5,357,631 A | 10/1994 | Howell et al. | 707/203 |
| 5,649,186 A | 7/1997 | Ferguson | 707/10 |
| 5,649,218 A | 7/1997 | Saito | 707/513 |
| 5,708,806 A | 1/1998 | De Rose et al. | 707/104.1 |
| 5,708,825 A | 1/1998 | Sotomayor | 707/501.1 |
| 5,761,684 A | 6/1998 | Gibson | 707/515 |
| 5,835,712 A * | 11/1998 | DuFresne | 707/10 |
| 5,848,410 A | 12/1998 | Walls et al. | 707/102 |
| 5,903,902 A | 5/1999 | Orr et al. | 707/517 |
| 5,920,859 A * | 7/1999 | Li | 707/10 |
| 5,973,696 A | 10/1999 | Agranat et al. | 345/760 |
| 5,983,234 A | 11/1999 | Tietjen et al. | 711/137 |
| 5,987,480 A | 11/1999 | Donohue et al. | 707/501.1 |
| 6,003,046 A * | 12/1999 | Nielsen | 707/5 |
| 6,014,678 A | 1/2000 | Inoue et al. | 707/501.1 |
| 6,026,474 A | 2/2000 | Carter et al. | 707/10 |
| 6,067,552 A * | 5/2000 | Yu | 707/3 |
| 6,122,647 A * | 9/2000 | Horowitz et al. | 707/102 |
| 6,212,530 B1 * | 4/2001 | Kadlec | 707/101 |
| 6,289,353 B1 * | 9/2001 | Hazlehurst et al. | 707/10 |
| 6,356,897 B1 * | 3/2002 | Gusack | 707/10 |

OTHER PUBLICATIONS

*Locating Information with Zdex*, by Tracy Ryan, Product Manager, pp. 1–6, Sequioa Software Corporation, www.sequoiasoftware.com.

* cited by examiner

*Primary Examiner*—Diane D. Mizrani
*Assistant Examiner*—Yicun Wu
(74) *Attorney, Agent, or Firm*—Brown Raysman Millstein Felder & Steiner LLP

(57) ABSTRACT

Data storage and retrieval methods are described in which data is stored in records within a docubase, and desired records are identified and/or selected by searching index files which map search criteria into appropriate records. Each index file includes a header with header entries and a body with body entries. Each header entry comprises a header-to-body pointer which points to a location in the body of the same index file which is the starting point of the body entries related to the header-to-body pointer pointing thereto. The body entries in turn comprise body-to-record-pointers which point to the records within the docubase satisfying the search criteria. Alternatively, the body entries may comprise body-to-body pointers which point to body entries in a second index file, which in turn point to the records within the docubase satisfying the search criteria. The records are stored in HTML format.

28 Claims, 4 Drawing Sheets

DOCUBASE INDEXING, SEARCHING AND DATA RETRIEVAL

RELATED APPLICATION INFORMATION

This application is related to U.S. pending patent application Ser. No. 09/577,271 filed May 23, 2000 entitled "Hypertext-Based Database Architecture" and naming Chris Nuñez as the sole inventor, which application is incorporated herein by reference, and is referred to herein as "the May 23, 2000 Nuñez application."

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to electronic data storage and retrieval. More particularly, the present invention relates to indexing technology including creation, organization, maintenance, and use of search indexes to accomplish the desired searching and data retrieval.

2. Description of Related Art

Electronic data/document storage and retrieval applications are relatively common. In fact, the Internet revolution has resulted in incredibly huge amounts of data being stored and retrieved using various application software, including database software, search engines, and browsers. Despite the incredible increase in the amount of data available, as technology advances consumers are continuing to demand increasingly speedy access to that data.

Many factors have contributed to the industry's success at delivering increased access speed to data. For example, technological advances have been realized with higher capacity and smaller physical storage devices, faster communications technologies, various system software algorithms involving caching, Cookies, data compression, multiple buffering, etc., and advanced application software algorithms involving data storage and retrieval.

However, data transfer rates between a computer memory and other devices such as a display monitor, a printer, or another storage device, are still limited due to physical I/O requirements. For example, there is a huge disparity in the speeds of I/O versus the speeds of executing instructions in memory, and this disparity affects data searching and sorting. Searching for data commonly requires multiple disk seek operations, wherein the read heads of the disk readers must be physically positioned to the proper sector of the disk to read the required data. This is true even if the searched data is already sorted, and such disk seek and read operations are extremely time consuming relative to any substantive operations performed on the desired data in a computer memory.

Additionally, the Internet revolution has led to widespread use of open data formats such as HTML and to a lesser extent currently, XML, and these data formats are widely used to present information to end-users. Nonetheless, many computer applications typically create the desired presentation pages dynamically only after retrieving the desired data to occupy the pages. Some computer applications use templates which require insertion of only certain data dynamically, whereas other computer applications dynamically create entire HTML pages for presentation. In either case, the overall data presentation time for end-users is affected. Thus, systems and methods are desirable for storing, retrieving, and displaying data in a widely-accepted open data format such as HTML, wherein the I/O involved in locating desired data is reduced and the presentation time to the end user is also reduced.

SUMMARY OF THE INVENTION

The present invention provides systems and methods for data storage and retrieval in which data is stored in records within a docubase, and desired records are identified and/or selected by conducting searches of index files which map search criteria into the appropriate records.

In accordance with the invention, an index file includes a header with header entries and a body with body entries. At least one header entry has a header-to-body pointer associated therewith which points to a body entry. The body entry pointed to is the first body entry in a set of body entries that are related to the header-to-body pointer pointing thereto. The body entries in turn comprise body-to-record-pointers which point to the desired records within a docubase. Various index files are used to map various search criteria to the desired records.

According to one aspect of the present invention, an end-user submits a search query to a software system. The query specifies desired search criteria, and is intended to identify records satisfying the search criteria. The proper index file to be searched is identified based upon the search criteria. The desired docubase records are then identified by locating the proper header entry within the identified index file, following the header-to-body pointer associated therewith to a corresponding body entry which is the first in a set of body entries related to the header-to-body pointer pointing thereto, and processing the set of body entries to identify and select those in the set which comprise the body-to-record pointers pointing to the desired records within the docubase. The records pointed to by the selected body-to-record pointers are then identified as the records satisfying the search criteria, and are presented to the end-user.

In another aspect of the present invention, a record comprises a master document stored in a file system. Optional view documents are associated therewith, which enable a docubase end-user to-view the data associated with the master document in various styles, sizes, formats, and quantities.

In another aspect of the present invention, the body-to-record-pointers include volume identifiers and record identifiers associated therewith, wherein the combination of a volume identifier and a record identifier is sufficient to identify a particular record within the docubase.

In another aspect of the present invention, a pair of index files is used cooperatively to identify and/or select the desired records in response to specific search criteria, wherein the first index file comprises body entries having body-to-body pointers pointing to the body of the second index file, and the second index file comprises body entries having body-to-record pointers.

In another aspect of the present invention, the master documents and view documents are stored in an widely-accepted data format, such as HTML or XML.

DESCRIPTION OF THE DRAWINGS

Further objects of this invention, together with additional features contributing thereto and advantages accruing therefrom, will be apparent from the following description of an embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the embodiments and examples shown should be considered as exemplars, rather than limitations on the apparatus and methods of the present invention.

The present invention provides systems and methods for data storage and retrieval in which data is stored in records within a docubase, and desired records are identified and/or selected by conducting searches of index files which map search criteria into the appropriate records. The overall organization, architecture, and use of the docubase may vary greatly depending upon the hardware and software operating environments involved, and a more detailed description of one such docubase is set forth in the May 23, 2000 Nuñez application, previously identified herein.

As used herein, "docubase" refers to a collection of data files referred to as documents, and optionally the associated index files and other supporting files used to search, access and maintain the documents. A document may be an individual file in a specified format (e.g., HTML, text, JPEG, BMP, etc.), or a folder or directory which itself includes other documents. Relationships between various documents in a docubase may be defined within the docubase itself, or externally. A docubase is stored on a machine-readable medium.

As used herein, "pointer" refers to information that is used to identify a relative or actual computer memory address. A pointer can be the address or offset itself, or it can be data used to calculate or determine the address or offset.

Index File Structures of the Present Invention

Figure 1:
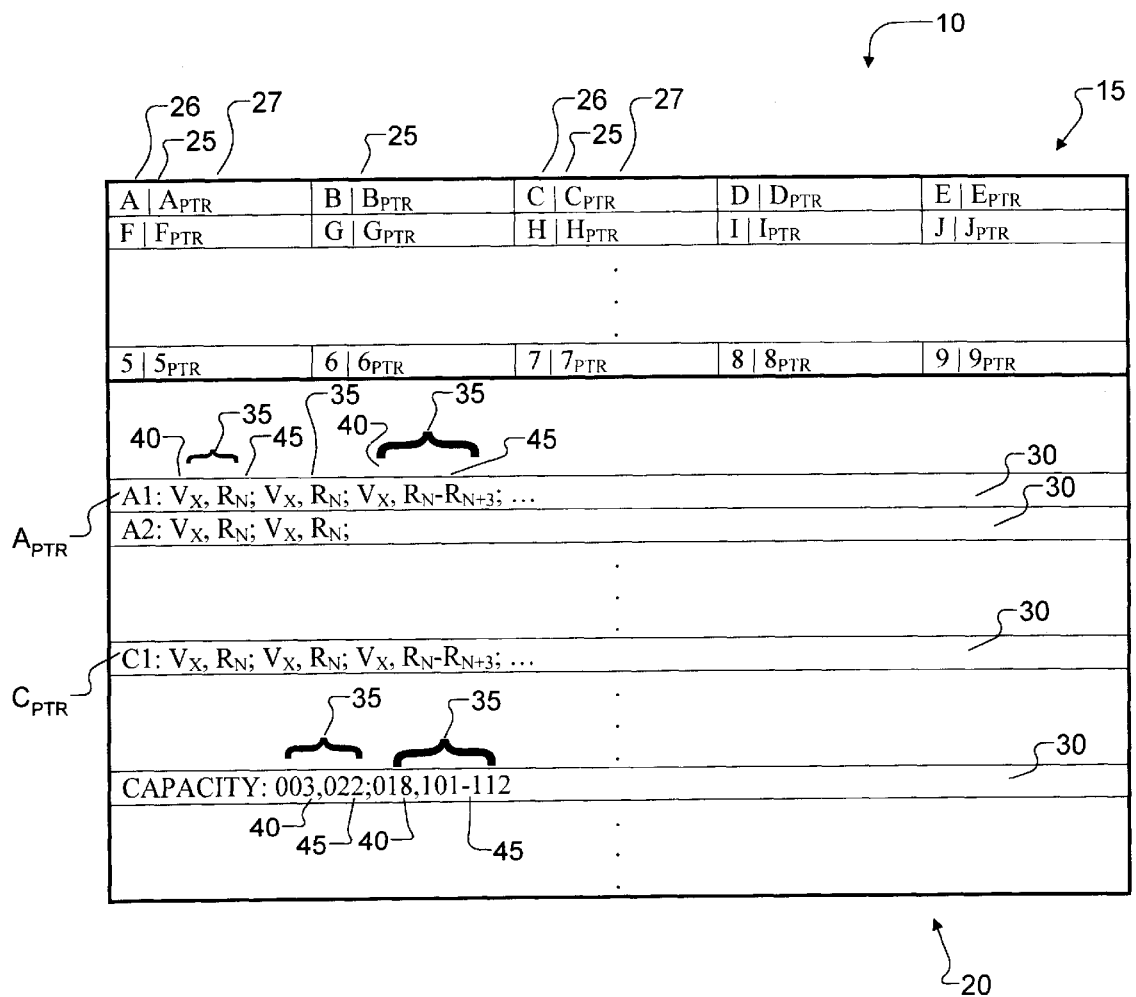
FIG. 1 shows the organization of one embodiment of an index file in accordance with the concepts of the present invention.

Turning to FIG. 1, the organization of one embodiment of an index file 10 is shown. The index file 10 has a header 15 comprising a plurality of header entries 25, and a body 20 comprising a plurality of body entries 30. Each header entry 25 comprises a corresponding header identifier 26 associated with a set of search criteria, and a header-to-body pointer 27 associated with the corresponding header identifier 26. The header-to-body pointers 27 are shown in FIG. 1 with the subscript "PTR". The association between the header identifiers 26 and the sets of search criteria is that each header identifier 26 corresponds to a valid search character used within the docubase. In the example shown in FIG. 1, the valid search characters are the alphanumeric characters A–Z and 0–9.

The header-to-body pointers 27 point to corresponding body entries 30 which are each an initial body entry 30 in a corresponding set of body entries related to the header-to-body pointer 27 pointing thereto. Each set corresponds to a valid search character within the docubase. For example, as seen in FIG. 1, the header-to-body pointer 27 shown as "$C_{PTR}$" points to the corresponding body entry 30 shown beginning with "C1". In this example, "C1" represents a valid search word or text string beginning with the character "C". The "C1" body entry 30 is the initial body entry 30 in the set of body entries 30 representing valid search words beginning with the character "C". The other members of the set of "C" body entries correspond to other words beginning with the character "C" (e.g., CAPACITY as shown in FIG. 1). All such body entries 30 are accessible by initially pointing to the "C1" body entry 30.

For example, the "C" body entries could be stored sequentially in memory, or linked by various data structures. In one embodiment, a set of body entries 30 is searched linearly, that is one entry after the other until the body entry 30 matching the search criteria is located, or it is otherwise determined that said body entry 30 does not exist. This method has the advantage of minimizing disk seek operations, and with relatively small amounts of data, the lost time as opposed to using, e.g., a binary search, is typically far outweighed by the time savings due to minimization of disk seek operations. The particular searching algorithm depends on the actual data representations used.

Each body entry 30 has at least one body-to-record-pointer 35 associated therewith that points to at least one of the docubase records. If a body entry 30 matching the search criteria is in fact located, the corresponding body-to-record pointers 35 are accessible which identify the records in the docubase which match the search criteria. In a docubase with multiple volumes, the body-to-record pointers 35 comprise a volume identifier 40 and a record identifier 45, as seen in FIG. 1, which combined are sufficient to identify specific records within the docubase. Note that a record identifier 45 may include a sequential range of records (e.g., $R_n$–$R_{n+3}$), or even a series of records not necessarily in a sequential range. The particular computer software or other algorithms used to process or parse the body-to-record pointers 35 are designed to identify such conditions.

Though the volume identifiers 40 and record identifiers 45 are illustrated generically in FIG. 1 as "$V_x$" and "$R_n$" respectively, a specific example is also shown in FIG. 1 for the body entry 30 beginning with "CAPACITY". For that body entry 30, the body-to-record pointers 35 are one having a volume identifier 40 and record identifier 45 with values of "003" and "022" respectively ("003,022"), and one having a volume identifier 40 and record identifier 45 with values of "018" and "101–112" respectively ("018,101–112"). In this example, the records containing the word "CAPACITY" or otherwise having the word "CAPACITY" associated therewith, could thus be found in the docubase on volume 3, record 22, and volume 18, records 101 through 112.

Figure 2:
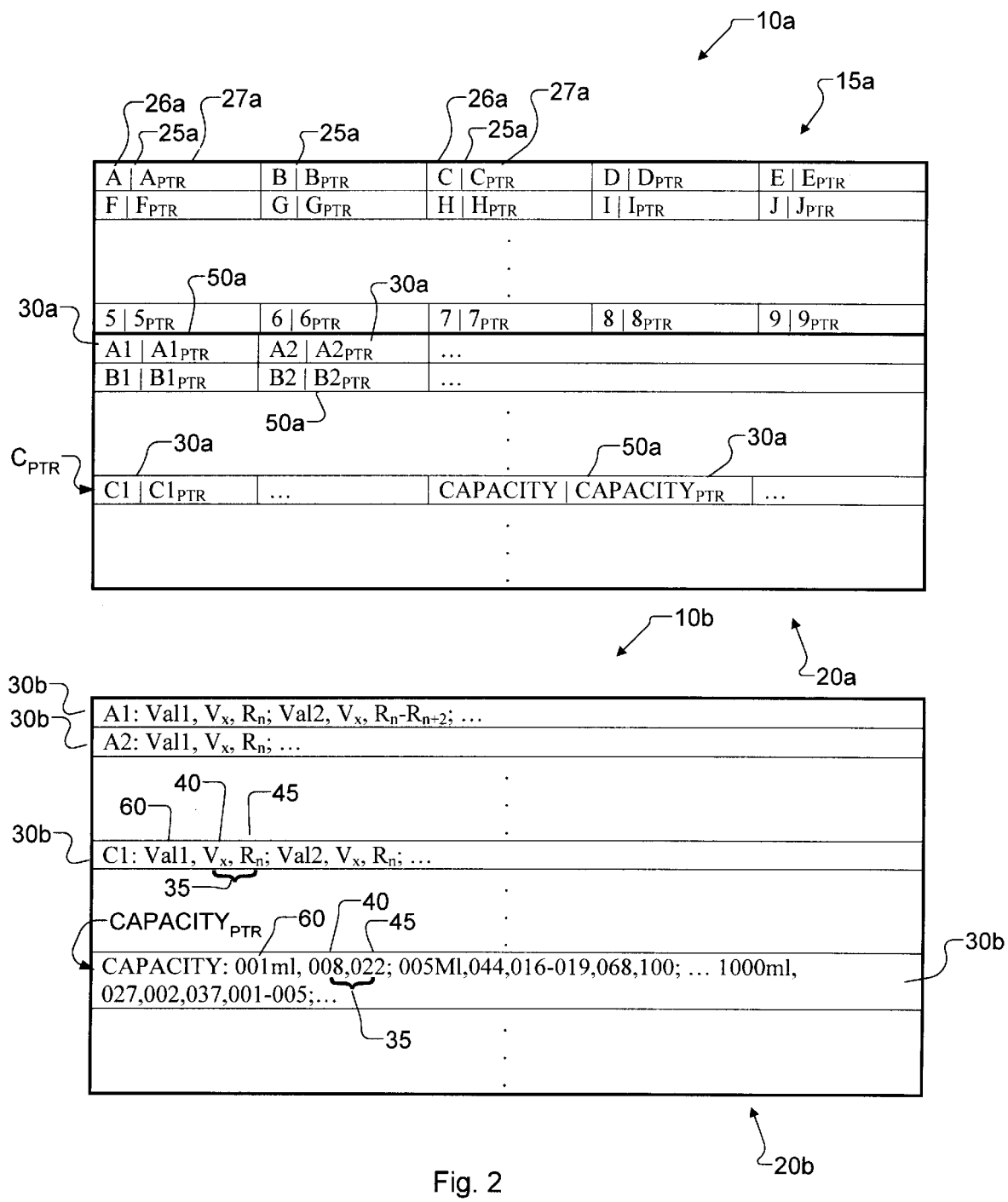
FIG. 2 shows the organization of one embodiment of a pair of index files in accordance with the concepts of the present invention.

In FIG. 1, the words (e.g., "A1", "A2", . . . "C1", . . . "CAPACITY") are followed by a colon, which is then followed by the body-to-record pointers 35, which in turn are separated by semi-colons, and wherein the volume identifiers 40 and record identifiers 45 forming the body-to-record pointers 35 are separated by commas. The end of a body entry 30 is delimited by a period. Other suitable data representation techniques may be used to comply with industry or proprietary standards, and those shown herein are for illustration purposes only. Turning now to FIG. 2, an embodiment of a pair of index files 10a and 10b of the present invention is shown. The first index file 10a has a first header 15a comprising a plurality of first header entries 25a, and a first body 20a comprising a plurality of first body entries 30a. The second index file 10b comprises a second body 20b having a plurality of second body entries 30b, and may also comprise a second header (not shown), which could be used for searches not requiring the pair of index files 10a and 10b.

Each first header entry 25a comprises a corresponding first header identifier 26a associated with a set of search criteria, and a header-to-body pointer 27a associated with the corresponding header identifier 26a, similar to the header entries 25 described in connection with FIG. 1. Similarly, each of the first body entries 30a has a pointer 50a associated therewith (shown in FIG. 2 with the subscript "PTR"). However, unlike the body-to-record pointers 35 as seen in FIG. 1, pointers 50a are body-to-body pointers that point to a corresponding one of the plurality of second body entries 30b, as described in more detail shortly.

Each second body entry 30b corresponds to a valid search word within the docubase. For example, as seen in FIG. 2, the header-to-body pointer 27a shown as "$C_{PTR}$" points to the corresponding first body entry 30a shown beginning with "C1". As in the example described in connection with FIG. 1, "C1" in this example also represents a valid search word or text string beginning with the character "C". The "C1" first body entry 30a is the initial first body entry 30a in a set of first body entries 30a representing valid search words beginning with the character "C". The other members of the set of "C" first body entries correspond to other words beginning with the letter "C" (e.g., "CAPACITY" as shown in FIG. 2). All such first body entries 30a are accessible by initially pointing to the "C1" first body entry 30a.

Still referring to FIG. 2, as previously described each first body entry 30a has a body-to-body pointer 50a associated therewith. The body-to-body pointers 50a point to a corresponding one of the plurality of second body entries 30b. The association between the body-to-body pointers 50a and the second body entries 30b to which they point, is that each second body entry 30b pointed to comprises information related to the search word associated with the body-to-body pointer 50a pointing thereto. For example, as seen in FIG. 2, first body entry 30a comprising the body-to-body pointer 50a shown as "$CAPACITY_{PTR}$", points to second body entry 30b comprising information related to the search word "CAPACITY", which is the same search word associated with the body-to-body pointer 50a pointing thereto.

Each second body entry 30b has at least one body-to-record-pointer 35 associated therewith that points to at least one of the docubase records. If a second body entry 30b matching the search criteria is in fact located, the corresponding body-to-record pointers 35 are accessible which identify the records in the docubase which match the search criteria. The example shown in FIG. 2, like that in FIG. 1, is for a docubase having multiple volumes, and thus the body-to-record pointers 35 comprise a volume identifier 40 and a record identifier 45. However, unlike the embodiment described in connection with FIG. 1, in the embodiment shown in FIG.2 the body-to-record pointers 35 further have associated therewith a value 60.

The values 60 are illustrated generically in FIG. 2 as "Val1, Val2, . . . ", but a specific example is also shown in FIG. 2 for the second body entry 30b beginning with "CAPACITY". For that second body entry 30b, the body-to-record pointers 35 shown are as follows:

a volume identifier 40 and record identifier 45 with values of "008" and "022" respectively ("008,022"), associated with a value 60 of 1 milliliter ("001 ml");

a volume identifier 40 and record identifier 45 with values of "044" and "016–019" respectively ("044,016–019"), associated with a value 60 of 5 milliliters ("005 ml");

a volume identifier 40 and record identifier 45 with values of "068" and "100" respectively ("068,100"), associated with the same value 60 of 5 milliliters;

a volume identifier 40 and record identifier 45 with values of "027" and "002" respectively ("027,002"), associated with a value 60 of 1000 milliliters ("1000 ml"); and a volume identifier 40 and record identifier 45 with values of "037" and "001–005" respectively ("037,001–005"), associated with the same value 60 of 1000 milliliters.

From the information associated with the second body entry 30b starting with the valid search word "CAPACITY", the following information can thus be determined that is associated with the valid search word "CAPACITY":

Record 22 of Volume 8 is associated with a value of 1 milliliter; Records 16 through 19 of Volume 44 are associated with a value of 5 milliliters; Record 100 of Volume 68 is also associated with the value of 5 milliliters; Record 2 of Volume 27 is associated with a value of 1000 milliliters; and Records 1 through 5 of Volume 37 are associated with the same value of 1000 milliliters. Search queries seeking all records representing items with a specific CAPACITY or a CAPACITY within a given range may thus be identified.

As with the embodiment described in connection with FIG. 1, the actual data representation techniques used to separate and/or connect various data within the index files 10a and 10b may vary to comply with industry or proprietary standards, and those shown herein are for illustration purposes only.

For a given docubase, various index files 10 may exist, including text index files, meta-data index files, property index files, and other index files. These index files 10 are used to map designated types of search criteria to appropriate records associated with the search criteria. For example text index files map text search criteria to selected records, meta-data index files map meta-data search criteria to selected records, and property index files map property search criteria to selected records. In practice, any type of data may be mapped to corresponding records, and thus index files 10 may take on various appropriate names and data formats.

The use of a single index file 10 as shown in FIG. 1 is desirable in situations wherein a searcher is interested in retrieving information based on search word themselves, whereas the use of a pair of index files 10a and 10b as shown in FIG. 2 is desirable in situations wherein the searcher is interested in retrieving information based on values associated with the search words. An example of the former situation is searching for records associated with meta-data, and a meta-data index file 10 would be searched. The searcher may simply want to identify all records associated with the meta-data word "engine". An example of the latter situation is searching for records associated with property data, and a pair of property index files 10a and 10b would be searched. The searcher may want to identify all records having a value of 300 psi associated with the property "pressure tolerance", or all records having a value in the range of 10 ml to 25 ml associated with the property "capacity". These methods are discussed herein in more detail, in connection with FIG. 4.

Figure 3:
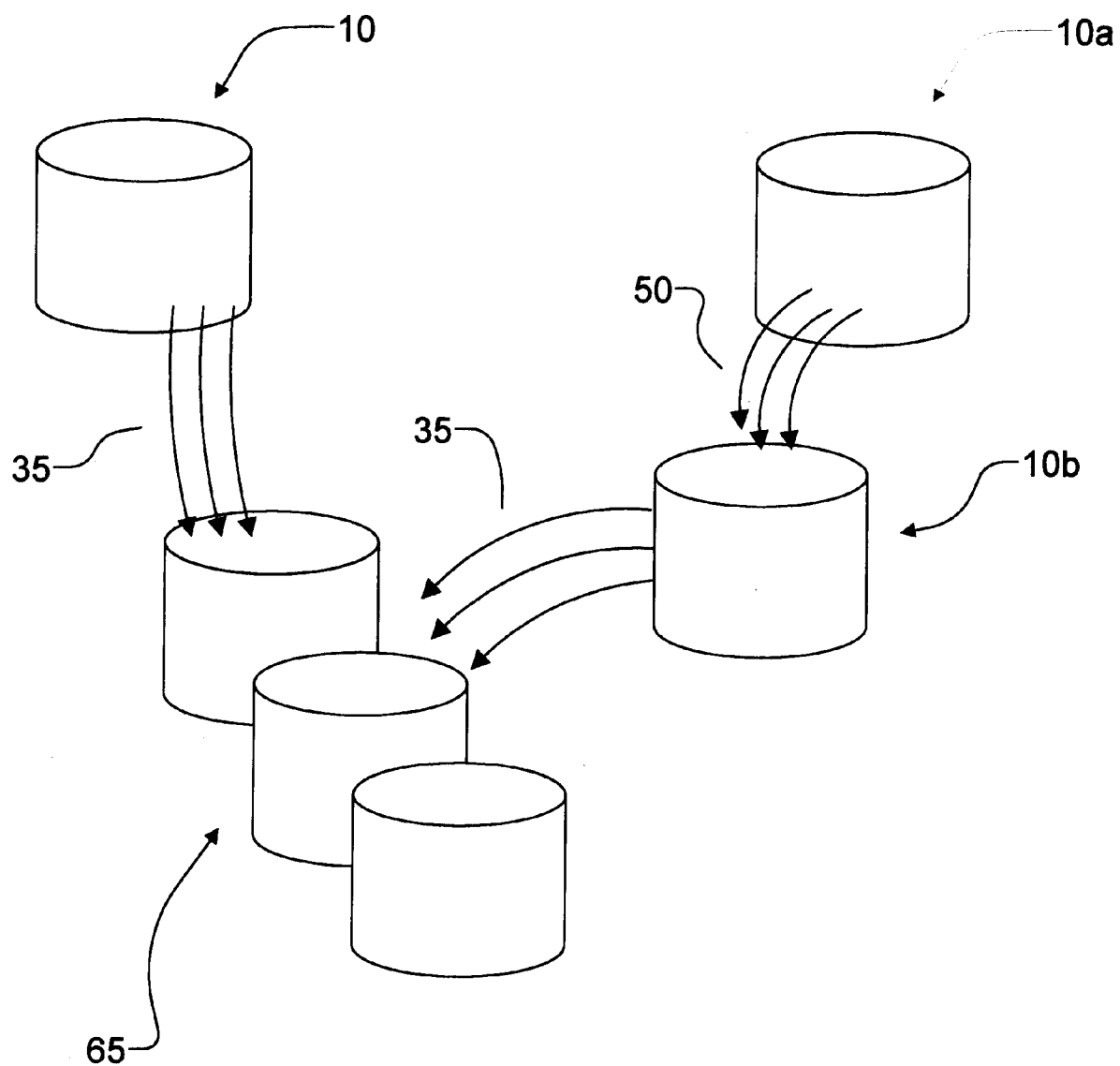
FIG. 3 shows the relationship of index files and records regarding the use of the index files to access the records in accordance with the concepts of the present invention.

Turning briefly now to FIG. 3, the relationship is shown of index files (10, 10a, and 10b) with records 65, regarding the use of the index files (10, 10a, and 10b) to access the records 65. In the embodiment using a single index file 10 to access the records 65 satisfying the search criteria, it can be seen that the pointers (body-to-record pointers 35) lead from the index file 10 directly to the records. On the other hand, in the embodiment using a pair of index files 10a and 10b, it can be seen that pointers (body-to-body pointers 50) from the first index file 10a lead to pointers (body-to-record pointers 35) in the second index file 10b, which then lead from the second index file 10b to the records 65.

Methods of the Present Invention

In much of the previous discussion, the existence of records 65 and index files 10 has been presumed. As the present invention in directed to the actual structure of the index files 10, as well as uses thereof, the manner in which the index files 10 are actually created is not critical. These files and records may be created using well-known programming algorithms, proprietary methods, or a combination thereof, to effect the desired associations for subsequent searches as described herein.

For example, the records 65 may be created by manual data entry, or processing of a series of data files, or a combination thereof, with various error checking and formatting algorithms designed to ensure the integrity of each record. Similarly, once the records 65 are created, the index files 10 and other supporting files may be created by sequential processing of the records 65, along with various sorting, merging, validation, and formatting algorithms.

One such example particularly suited for creating a text index file 10, includes identifying text strings that should (or should not) be indexed. Such identification may occur using a combination of table logic for inclusion or exclusion, along with the placement of markers in the records 65 at appropriate locations. The markers may comprise non-printable or non-viewable characters, and may be placed in such a manner that a proprietary parsing algorithm may identify the markers and take appropriate indexing (or non-indexing) actions. The parsing may occur in a single pass, or multiple passes, and resulting text index files 10 may be written at any stage in the process. Aliases and other word variations, such as possessives, plurals, alternate or misspelled words, homonyms, etc., may be accounted for, so that, e.g., in the "capacity" examples previously discussed herein, a search for "volume" or "storage capacity" would yield the same results as searches using the search word "capacity".

Additionally, the records 65 may be maintained in real time or at various update intervals, and the index files 10 and other files may likewise be updated or regenerated as needed to maintain synchronization with updated records 65. Other files may include, e.g.: template files for defining document layouts; common query index files which map anticipated search queries to appropriate records; meta-files which associate meta-data sets with corresponding records for a specified volume; and cumulative meta-files which associate meta-data sets with corresponding records for the entire docubase.

Once created, the index files 10 are used to identify and/or select desired records by conducting searches of the index files 10 which map search criteria into the appropriate records satisfying the search criteria. In a typical use of the present invention, a searcher or end-user submits search criteria to a software system implementing the concepts described herein, aimed at identifying records 65 within the docubase which have characteristics associated therewith matching the search criteria. The docubase is then searched, and the records 65 corresponding to the search criteria are identified and presented to the searcher. Multiple criteria may be specified in an initial query, in which case sub-queries may be invoked and logical operations (such as AND'ing, OR'ing, etc.) may be performed on the resulting sets of identified records from each individual sub-query to yield a final desired result representing the records which satisfy the full search criteria.

As a practical example of how an index file 10 might be used in response to a query by a searcher, referring back to FIG. 1 this example will presume the searcher has initiated a query for all records 65 containing the word "capacity". In accordance with the present invention, based on the source, type, or other information associated with the initial query, the searching algorithm will identify the text index file as the index file 10 to search. Because the search query is for a string beginning with the letter "C", the header entry 25 comprising the header identifier 26 shown as "C" will be located. This may be accomplished, e.g., using calculations based upon a known fixed length of each header entry 25 and a known collating character sequence, at the expense of only a single disk seek operation. The header-to-body pointer 27 associated with that header entry 25 is shown as "$C_{PTR}$". The body entries 30 beginning at the location pointed to by $C_{PTR}$ are then processed.

The processing may begin by reading a first sequential block of data into memory, at the expense of another disk seek operation. In the example of FIG. 1, after processing the body entry 30 associated with search word "C1", and then perhaps other body entries (signified by vertical ellipses), "capacity" is located and the body-to-record pointers 35 associated therewith indicate that the text string "capacity" is located in volume 3 record 22, and volume 18 records 101 through 112. Thus, using only two disk seek operations, the desired records are identified.

Figure 4:
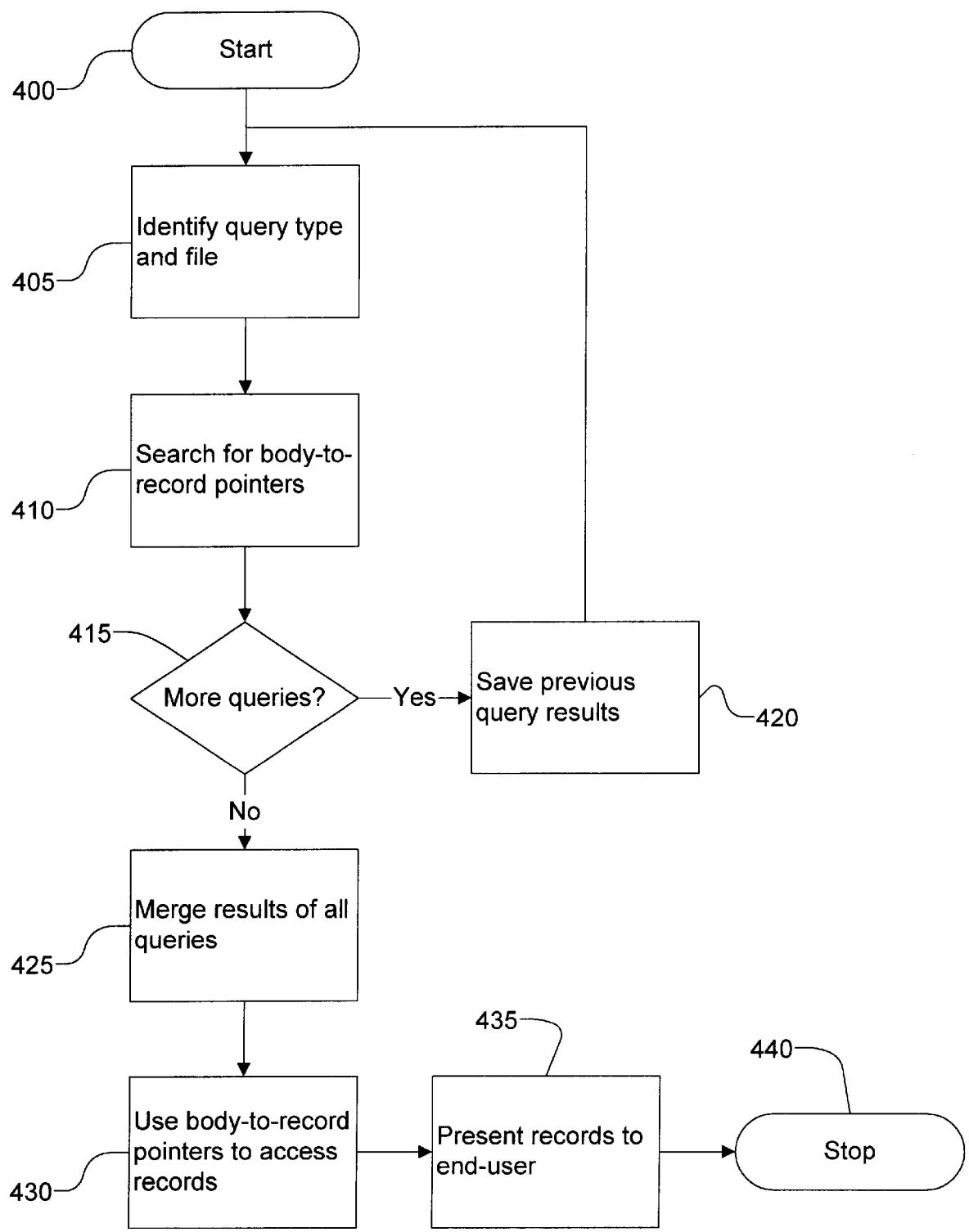
FIG. 4 is a flowchart showing the typical steps used to identify and access records based on queries in accordance with the concepts of the present invention.

Turning to FIG. 4, a flowchart is shown illustrating the typical steps used to identify and access records based on queries in accordance with the present invention. The steps shown are used to obtain records in response to a query or set of queries by a searcher. The process begins at step 400, and based upon the nature and source of the query, as well as other potential factors, at step 405 the query type and the appropriate index file 10 to search are identified. For example, the query type might be a query based upon a text string, meta-data, properties, common queries, or any combination of those or other types of queries. The appropriate index file 10 to search might then be a text index file, a meta-data index file, a property index file, or a common query index file respectively.

Once the appropriate index file to search has been identified, then at step 410 the body-to-record pointers 35 are searched for. If, for example, the file being searched is a text index file 10 or a meta-data index file 10, then the appropriate chain to the body-record pointers 35 would be via the header 15 to the body 20 as previously described herein. And if the search criteria required search of a pair of index files 10a and 10b (e.g., property index files), then the appropriate chain to the body-to-record pointers 35 would be via the first header 15a to the first body 20a (indexing the search word), then to the second body 20b (indexing the values associated with the search word) as previously described herein.

Once the body-to-record pointers 35 are identified, then at step 415 it is determined whether the query has been completely satisfied, or if the query has been only partially satisfied. The latter would occur, for example, in a multi-part query, wherein only the first part had been satisfied up through the initial execution of steps 405 and 410. If there are more queries, then the process proceeds to step 420, where the results of intermediate or previous queries are saved, and the process returns to step 405 to continue processing the remainder of the queries or query parts. Eventually, at step 415 there will be no more queries, and the process then proceeds to step 425 where the results of all previous queries (i.e., sub-parts of a is multi-part query) are merged. The merging may actually occur dynamically during steps 405 and 410, or a single merge may occur once the process reaches step 425. In either case, the resulting body-to-record pointers 35 will be those that satisfy the complete query, whether the query be a single query or a multi-part query.

The body-to-record pointers 35 are then used to access the records 65, as seen at step 430. The data obtained is then presented to the searcher at step 435 in any conventional manner. In accordance with one aspect of the present invention, the records are stored in a widely-accepted data format, such as HTML or XML, and are therefore presented efficiently in an HTML- or XML-compatible environment. That is, the records have complete display formatting data associated therewith, so that once the records 65 satisfying the search criteria are identified and located, they may be retrieved and presented to the searcher on a display device without the need for dynamic page creation, formatting, etc.

The records 65 each have a master document associated therewith, and may optionally have various view documents associated therewith which enable a docubase user to view data associated with each record in various styles, sizes, formats, and quantities. The various views of the selected records 65 may be presented in response to requests therefor from the searcher. The view records are also formatted in HTML for efficient presentation in an HTML-compatible environment.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

For example, any predefined associations described herein may instead be user-defined and/or programmable, without altering the inventive concepts described herein. Additionally, though the invention has been described in terms of a single docubase, the concepts described herein are equally applicable across multiple docubases. Furthermore, index files 10 other than those described herein may be implemented to satisfy the needs and/or desires of any particular docubase. Similarly, the concepts described herein have been described in terms of certain combinations of features and methods, any of which may be implemented and used in any combination with each other unless they are clearly and unequivocally mutually exclusive.

It is claimed:

1. A method of searching a docubase, the docubase comprising a document-based database including a plurality of documents and having records stored on a machine-readable medium, each of the records comprising one or more of the plurality of documents not required to be stored in database tables, comprising:

receiving a search query comprising search criteria of the docubase;

identifying an index file to search in response to the search query, said index file comprising a header having a plurality of header entries and a body having a plurality of body entries, at least one of the plurality of header entries having a header-to-body pointer associated therewith that points to a corresponding one of the plurality of body entries, at least one of the plurality of body entries having a body-to-record pointer associated therewith that points to one of the records;

identifying one of the plurality of header entries corresponding to the search criteria;

identifying the header-to-body pointer associated with the identified header entry;

accessing the body entry pointed to by the identified header-to-body pointer, said accessed body entry being the first in a set of body entries related to the identified header-to-body pointer;

identifying the body entries within the set which have associated therewith body-to-record pointers pointing to records satisfying the search criteria; and accessing the records satisfying the search criteria.

2. The method of claim 1, wherein at least one of the body-to-record pointers associated with the identified body entries comprises a volume identifier and an associated record identifier.

3. The method of claim 1, wherein at least one of the accessed records has corresponding complete display formatting data associated therewith, and further comprising the step of displaying the accessed records on a display device in a format specified by the corresponding complete display formatting data.

4. The method of claim 1, wherein the accessed records comprise a first accessed record comprising a master document and a view document.

5. The method of claim 1, wherein at least one of the plurality of header entries comprises a corresponding header identifier associated with a corresponding set of search criteria, and wherein the step of identifying one of the plurality of header entries corresponding to the search criteria is accomplished by determining the header identifier associated with the search criteria and then identifying the header entry associated with the determined header identifier.

6. A method of searching a docubase comprising a document-based database, the docubase having records stored on a machine-readable medium, the records comprising a plurality of documents not required to be stored in database tables, comprising:

receiving a search query comprising search criteria of the docubase;

identifying a pair of index files to search in response to the search query, said pair including a first index file comprising a first header and a first body, and a second index file comprising a second body, said first header having a plurality of first header entries each having a header-to-body pointer associated therewith that points to a corresponding one of a plurality of first body entries associated with the first body, the first body entries each having a body-to-body pointer associated therewith that points to a corresponding one of a plurality of second body entries associated with the second body, the second body entries each having a corresponding body-to-record pointer associated therewith, and a corresponding value associated with the corresponding body-to-record pointer, said body-to-record pointer pointing to a corresponding one of the records having the corresponding value associated therewith;

identifying one of the plurality of first header entries corresponding to the search criteria;

identifying the header-to-body pointer associated with the identified first header entry;

accessing the first body entry pointed to by the identified header-to-body pointer, said accessed first body entry being an initial first body entry in a set of first body entries related to the identified header-to-body pointer;

identifying the first body entry within the set of first body entries which has associated therewith a body-to-body pointer pointing to the second body entry having a body-to-record pointer pointing to a record satisfying the search criteria; and accessing the record satisfying the search criteria.

7. The method of claim 6, wherein the body-to-record pointer pointing to the record satisfying the search criteria comprises a volume identifier and an associated record identifier.

8. The method of claim 6, wherein each of the accessed records has corresponding complete display formatting data associated therewith, and further comprising the step of displaying the accessed records on a display device in a format specified by the corresponding complete display formatting data.

9. The method of claim 6, wherein the accessed records comprise a first accessed record comprising a master document and a view document.

10. The method of claim 6, wherein each of the plurality of first header entries comprises a corresponding header identifier associated with a corresponding set of search criteria, and wherein the step of identifying one of the plurality of first header entries corresponding to the search criteria is accomplished by determining the header identifier associated with the search criteria and then identifying the first header entry associated with the determined header identifier.

11. A docubase comprising a document-based database including a plurality of documents, the docubase comprising:

a plurality of records stored in a machine-readable medium, each of the plurality of records comprising one or more of the plurality of documents not required to be stored in database tables, each of said plurality of records comprising a corresponding master document;

an index file comprising:
 a header having a plurality of header entries and
 a body having a plurality of body entries,
 wherein at least one of the plurality of header entries has a header-to-body pointer associated therewith that points to a corresponding one of the plurality of body entries,
 at least one of the pointed to body entries is an initial body entry in a corresponding set of the body entries related to the header-to-body pointer pointing thereto,
 at least one of the plurality of body entries has a body-to-record pointer associated therewith that points to one of the plurality of records,
 at least one of the plurality of header entries further has a corresponding header identifier associated with a corresponding set of search criteria.

12. The docubase of claim 11, wherein at least one of the body-to-record pointers comprises a volume identifier and an associated record identifier.

13. The docubase of claim 12, wherein at least one of the plurality of records has corresponding complete display formatting data associated therewith.

14. The docubase of claim 11, wherein at least one of the plurality of records has corresponding complete display formatting data associated therewith.

15. The docubase of claim 11, wherein the index file is a meta-data index file.

16. A docubase comprising a document-based database including a plurality of documents, the docubase comprising:

a plurality of records stored in a machine-readable medium, each of the plurality of records comprising one or more of the plurality of documents not required to be stored in database tables, each of said plurality of records comprising a corresponding master document;

a first index file comprising a first header having a plurality of first header entries, and a first body having a plurality of first body entries;

a second index file comprising a second body having a plurality of second body entries;

at least one of said first header entries has a header-to-body pointer associated therewith that points to a corresponding one of the plurality of first body entries, and a corresponding header identifier associated with a corresponding set of search criteria, at least one of said first body entries has a body-to-body pointer associated therewith that points to a corresponding one of the plurality of second body entries, at least one of said second body entries has a corresponding body-to-record pointer associated therewith, and a corresponding value associated with the corresponding body-to-record pointer, said body-to-record pointer pointing to a corresponding one of the records having the corresponding value associated therewith.

17. The docubase of claim 16, wherein at least one of the body-to-record pointers comprises a volume identifier and an associated record identifier.

18. The docubase of claim 17, wherein at least one of the plurality of records has corresponding complete display formatting data associated therewith.

19. The docubase of claim 16, wherein at least one of the plurality of records has corresponding complete display formatting data associated therewith.

20. The docubase of claim 16, wherein the index file is a meta-data index file.

21. In a docubase comprising a document-based database including a set of indexed records, the set of indexed records comprising a plurality of documents stored in a file system, the documents not required to be stored in database tables, a computer-based method for searching the set of indexed records according to a search query, the search query comprising one or more search criteria for which the search query specifies a value, the method comprising:

indexing a plurality of records comprising documents stored in a file system, one or more of the documents not comprising database tables, wherein the indexing identifies each of the plurality of records by its position, the position of a record being an integer value relating to the record's logical position in the file system, and wherein the indexing indicates the value of one or more search criteria for the plurality of records;

for each search criterion of the search query, composing an intermediate list of positions, wherein each position in the intermediate list relates to a record having the value for the search criterion specified in the search query; and performing a logical operation between or among the intermediate lists to compose a final list, if more than one intermediate list exists, wherein the final list is a list of records that satisfy the search query.

22. The method of claim 21 further comprising the step of displaying which records of the plurality of records satisfy the search query.

23. The method of claim 21 wherein the intermediate list of records is a list of integers.

24. The method of claim 21 wherein the index comprises a first index and a second index the first index including a list of pointers to the second index.

25. The method of claim 21 wherein the position comprises a volume identifier and an associated record identifier.

26. A docubase for performing a query of indexed records according to a search query, the docubase comprising a document-based database comprising documents not required to be stored in database tables, the search query specifying one or more search criteria for which to search, comprising:

a storage medium containing a plurality of records, the plurality of records comprising a plurality of documents stored in a file system, one or more of the documents not comprising database tables, wherein one or more of the records is assigned a value to one or more of the search criteria;

p an indexer that identifies the plurality of records by a position, the position of each record being a number that relates to the record's logical position in the file system, wherein the indexer indicates a value for one or more of the search criteria for one or more of the records;

a fist processor that generates an intermediate list for each search criterion, wherein each intermediate list contains each of the records that conforms to the corresponding search criterion; and a second processor that generates a final list from the one or more intermediate lists, wherein the final list contains each of the records that conforms to the search query.

27. The system of claim 26 wherein each intermediate list is a list of integers.

28. The system of claim 26 wherein the indexer comprises a first index and a second index, wherein the first index includes a list of pointers to the second index.

* * * * *

UNITED STATES PATENT AND TRADEMARK OFFICE
CERTIFICATE OF CORRECTION

PATENT NO. : 6,625,596 B1
DATED : September 23, 2003
INVENTOR(S) : Chris Nunez

It is certified that error appears in the above-identified patent and that said Letters Patent is hereby corrected as shown below:

Column 5,
Line 7, beginning with the word "Turning" insert -- ¶ --.

Column 9,
Line 15, after the word "a" delete the word "is".

Column 13,
Line 18, before the word "the" insert -- , --.

Column 14,
Line 7, before the word "an" delete the letter "p".
Line 13, change the word "fist" to the word -- first --.

Signed and Sealed this

Eighteenth Day of November, 2003

JAMES E. ROGAN
*Director of the United States Patent and Trademark Office*